United States Patent
Kitamura

(10) Patent No.: US 9,124,803 B2
(45) Date of Patent: Sep. 1, 2015

(54) IMAGE PICKUP APPARATUS, METHOD OF CONTROLLING THE SAME, REPRODUCTION APPARATUS, AND METHOD OF CONTROLLING THE SAME

(71) Applicant: CANON KABUSHIKI KAISHA, Tokyo (JP)

(72) Inventor: Jumpei Kitamura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 111 days.

(21) Appl. No.: 13/720,329

(22) Filed: Dec. 19, 2012

(65) Prior Publication Data

US 2013/0162854 A1 Jun. 27, 2013

(30) Foreign Application Priority Data

Dec. 27, 2011 (JP) ................................. 2011-286125

(51) Int. Cl.
| | |
|---|---|
| H04N 5/225 | (2006.01) |
| H04N 5/228 | (2006.01) |
| H04N 5/76 | (2006.01) |
| G03B 17/00 | (2006.01) |
| H04N 5/232 | (2006.01) |

(52) U.S. Cl.
CPC ....... *H04N 5/23245* (2013.01); *H04N 5/23258* (2013.01)

(58) Field of Classification Search
None
See application file for complete search history.

(56) References Cited

U.S. PATENT DOCUMENTS

| | | | |
|---|---|---|---|
| 7,825,939 B2 * | 11/2010 | Mukunashi | 345/619 |
| 8,422,849 B2 * | 4/2013 | Tsutsui | 348/231.2 |
| 8,471,944 B2 * | 6/2013 | Nonaka et al. | 348/333.05 |
| 8,526,740 B2 * | 9/2013 | Hamada | 382/190 |
| 2002/0081094 A1 * | 6/2002 | Hatabu | 386/52 |
| 2002/0140826 A1 * | 10/2002 | Sato et al. | 348/222.1 |
| 2002/0197067 A1 * | 12/2002 | Ohnishi | 386/120 |
| 2003/0095191 A1 * | 5/2003 | Saito | 348/220.1 |
| 2006/0221204 A1 * | 10/2006 | Ogawa | 348/223.1 |
| 2007/0035635 A1 * | 2/2007 | Misawa | 348/222.1 |
| 2007/0098381 A1 * | 5/2007 | Oshima | 396/52 |
| 2007/0115364 A1 * | 5/2007 | Kumaki | 348/208.99 |
| 2007/0115374 A1 * | 5/2007 | Tsujimura et al. | 348/231.99 |
| 2007/0291114 A1 * | 12/2007 | Oshima | 348/126 |
| 2009/0059017 A1 * | 3/2009 | Kurokawa | 348/208.1 |
| 2010/0034463 A1 * | 2/2010 | Hamada | 382/190 |

(Continued)

FOREIGN PATENT DOCUMENTS

JP 2006-129426 A 5/2006

*Primary Examiner* — Michael Osinski
(74) *Attorney, Agent, or Firm* — Fitzpatrick, Cella, Harper & Scinto

(57) ABSTRACT

An image pickup apparatus includes an image pickup unit that generates moving object image data. A detection unit detects a shooting direction of the image pickup and/or an attitude of the image pickup apparatus. A storage unit temporarily stores moving image data generated by the image pickup. An instruction unit instructs operation to photograph a still image. A recording unit reads out the moving image data traced back by a predetermined time period from a timing when still image photographing is instructed by the instruction unit, from the storage unit, and records the read-out moving image data in a recording medium. In the moving image data, traced back by the predetermined time period, the recording unit does not record, in the recording medium, at least a portion of the moving image data in the predetermined time period, based on the detected shooting direction and/or attitude of the image pickup apparatus.

9 Claims, 6 Drawing Sheets

(56) References Cited

U.S. PATENT DOCUMENTS

| | | | |
|---|---|---|---|
| 2010/0299353 A1* | 11/2010 | Kodate et al. | 707/769 |
| 2012/0008923 A1* | 1/2012 | Kasai | 386/343 |
| 2012/0140833 A1* | 6/2012 | Takada | 375/240.26 |
| 2014/0241697 A1* | 8/2014 | Yoneda | 386/248 |
| 2014/0248035 A1* | 9/2014 | Tsuda | 386/241 |
| 2014/0285677 A1* | 9/2014 | Fujita et al. | 348/208.6 |

* cited by examiner

IMAGE PICKUP APPARATUS, METHOD OF CONTROLLING THE SAME, REPRODUCTION APPARATUS, AND METHOD OF CONTROLLING THE SAME

CLAIM OF PRIORITY

This application claims the benefit of Japanese Patent Application No. 2011-286125, filed Dec. 27, 2011, which is hereby incorporated by reference herein in its entirety.

BACKGROUND OF THE INVENTION

1. Field of the Invention

The present invention relates to an image pickup apparatus that can be used for obtaining moving image data, a reproduction apparatus, a method of controlling the image pickup apparatus, and a method of controlling the reproduction apparatus.

2. Description of the Related Art

In recent years, an image pickup apparatus is known, which stores a moving image of a predetermined time period (for instance, four seconds) precedent to depression of a shutter button, when a still image is photographed. Concerning such an image pickup apparatus that records the moving image before the still image is photographed, a technology is disclosed that includes determining a storage format on the basis of the motion amount of the moving image, and suppressing the consumption of a recording medium (for instance, see Japanese Patent Application Laid-Open No. 2006-129426).

However, in the technology described in Japanese Patent Application Laid-Open No. 2006-129426, even when a shooting direction largely changes between the time before the still image is photographed and the time when the still image is photographed, the moving image data is recorded as it is. Because of this, there is a problem that, when a photographer reproduces the moving image data, a moving image such as a largely-vibrated picture screen, which a photographer did not intend to photograph, occasionally results in being displayed.

SUMMARY OF THE INVENTION

An aspect of the present invention is to solve all or at least one of the problems described above.

In addition, in view of the above-described problems, one aspect of the present invention seeks to enable an image pickup apparatus to obtain desired moving image data in a case when a shooting direction largely changes.

In addition, an image pickup apparatus according to one aspect of the present invention picks up an object, generates moving image data, detects one of a shooting direction and an attitude of the image pickup apparatus, temporarily stores the generated moving image data in a storage unit, reads out the moving image data traced back by a predetermined time period from a time point when still image photographing is instructed, from the storage unit, and records the read-out moving image data in a recording medium, wherein at least a portion of the moving image data in a predetermined time period is deleted based on the detected one of the shooting direction and the attitude of the image pickup apparatus, and the resultant moving image data is recorded in the recording medium.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

First Embodiment

A digital still camera will be described below, which is one example of an image pickup apparatus of the present embodiment. In the following description, a function for discriminating whether image data recorded in a RAM is image data, which a photographer desires or not, will be mainly described.

Figure 1:
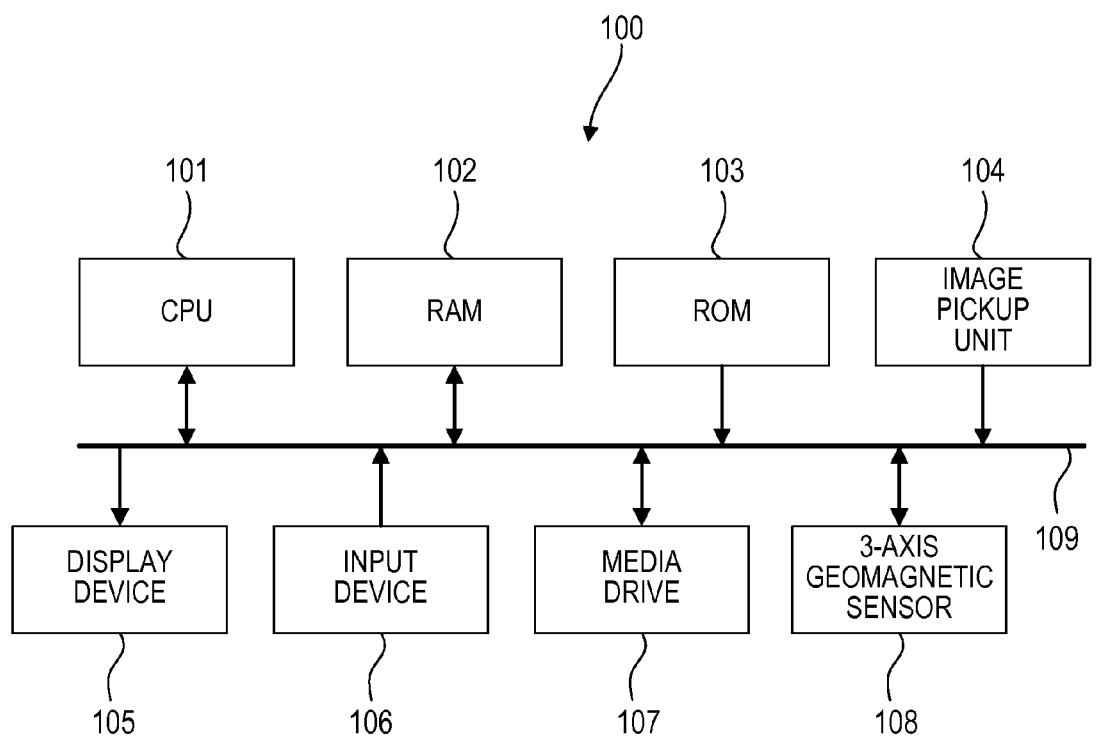
FIG. 1 is a block diagram illustrating a configuration example of a digital still camera according to first and second embodiments.

FIG. 1 is a block diagram illustrating a configuration example of the digital still camera 100 according to the present embodiment. In FIG. 1, a CPU 101 is responsible for the entire control of the digital still camera 100. A RAM 102 functions as a main memory of the CPU 101. Furthermore, various programs, including a control program for implementing the processing, which will be described later, are developed from a ROM 103, or the like. In addition, the RAM 102 functions as a region for temporarily recording image data therein. In the ROM 103, the above-described programs are recorded.

An image pickup unit 104 generates electrical image data from an optical image by using a solid-state image pickup element. A display device 105 preformats various displays according to the display control of the CPU 101. An input device 106 is an operation unit that is provided, for instance, with a button such as a shutter button for a still image, which is an instruction unit, and the like, and the CPU 101 performats various operations according to input informatation. A media drive (recording medium mounting unit) 107 mounts a detachable recording medium thereon, and thereby, can record data and read out the recorded data. A three-axis geomagnetic sensor 108 is a unit for expressing a shooting direction of the digital still camera 100 with a three-dimensional vector. A system bus 109 is an address bus, a data bus, and a control bus, which connect the above-described units to each other.

Incidentally, the above-described three-axis geomagnetic sensor 108 is arranged to detect the shooting direction of the digital still camera 100, but may be arranged to detect the attitude of the camera.

The digital still camera 100 of the present embodiment has a mode of temporarily recording image data obtained from the solid-state image pickup element after a power source is turned on, and shooting direction data obtained by the three-axis geomagnetic sensor 108, in the RAM 102. In this mode, the image data and the shooting direction data are related to each other to be temporarily recorded in the RAM 102. In addition, when the image data is recorded in this way so that the recorded image data exceeds a fixed amount of capacity, the recorded old data is deleted to record new data on a FIFO (First In First Out) basis.

When the photographing of the still image is instructed, the image data and a portion of, or all of, the shooting direction data recorded in the RAM 102 are recorded in the recording medium mounted on the media drive 107 in accordance with a predetermined moving image format, as moving image data. The digital still camera 100 of the present embodiment performs such recording processing of the moving image data within a predetermined recording time range upon single photographing of a still image.

In addition, in the present embodiment, note that a predetermined recording time is defined as a moving image recording time L, and is set at four seconds as a default value. In the present embodiment, in such a mode, a method of recording the moving image data provided by removing the image data, which a photographer does not desire, will be described below.

Figure 2:
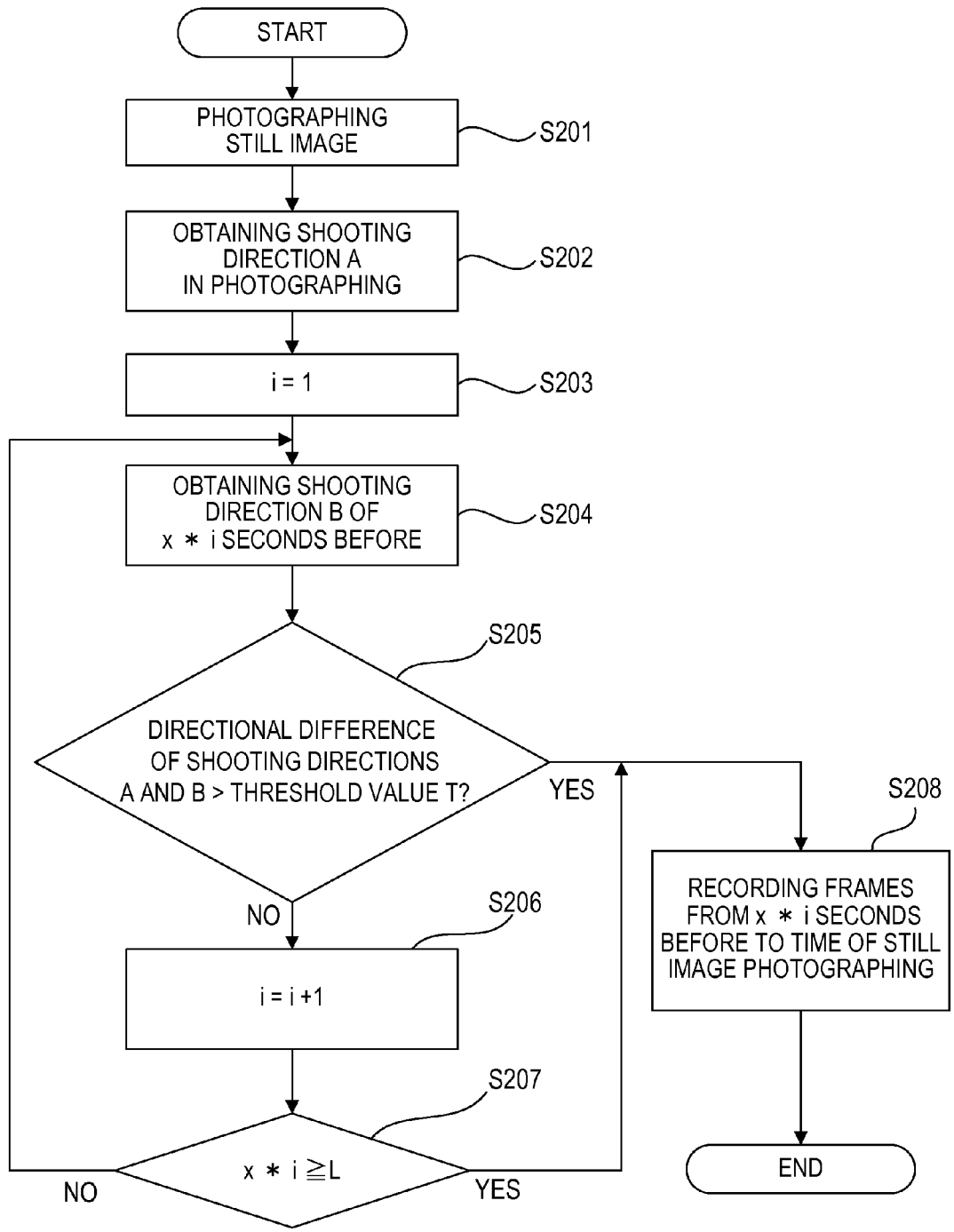
FIG. 2 is a flow chart illustrating one example of a photographing procedure in a digital still camera according to the first embodiment.

FIG. 2 is a flow chart illustrating one example of a photographing procedure in the digital still camera 100 of the present embodiment. The processing illustrated in FIG. 2 is performed by the CPU 101, which executes the control program that is developed from the ROM 103 to the RAM 102. In addition, in the following description, note that the digital still camera 100 operates in a mode of temporarily recording image data obtained by the solid-state image pickup element after the power source is turned on, and the shooting direction data obtained by the three-axis geomagnetic sensor 108, in the RAM 102.

First, in a step S201, the CPU 101 receives an instruction to photograph a still image from the input device 106, and starts the processing of photographing the still image. Then, in a step S202, the CPU 101 obtains information on a shooting direction A of the digital still camera 100 at the time when the still image is photographed, from the shooting direction data that is recorded in the RAM 102. Subsequently, in a step S203, the CPU 101 assigns 1 to a counter i. The counter i is a counter that is used for discriminating whether the image data recorded in the RAM 102 is image data, which the photographer desires or not, while tracing back the recorded image data starting from the image data at a time of still image photographing.

Next, in a step S204, the CPU 101 obtains information on a shooting direction B of the time traced back from the time when the photographing of the still image is started by a time period t given by multiplying the counter i by the width of a step x, from the shooting direction data recorded in the RAM 102. Incidentally, note that 0.5 seconds are set as a default value of the width of the step x.

Next, in a step S205, a directional difference between the shooting direction A and the shooting direction B is calculated, and it is discriminated whether the calculated directional difference exceeds a predetermined value (threshold value T) or not. Specifically, the directional difference diff is calculated by obtaining a degree of similarity of cosine between a vector $V_A$ that shows the shooting direction A and a vector $V_B$, that shows the shooting direction B, with reference to the time when the still image is photographed, according to the following expression (1). Incidentally, 0.2 is used as a default value of the threshold value T.

$$\text{diff} = V_A \cdot V_B / ||V_A|| * ||V_B|| \tag{1}$$

Here, $V_A * V_B$ represents an inner product of the vectors $V_A$ and $V_B$, and $||V_A||$ and $||V_B||$ represent magnitudes (norm) of the vectors $V_A$ and $V_B$, respectively. When the directional difference diff exceeds the threshold value T as a result of the discrimination in the step S205, the step advances to a step S208, and when the directional difference diff does not exceed the threshold value T as the result, the step advances to a step S206.

In the step S206, 1 is added to the counter i. Then, in a step S207, it is discriminated whether the time period t given by multiplying the counter i by the width of the step x is equal to or greater than a moving image recording time L. When the time period t is equal to or greater than the moving image recording time L as a result of this discrimination, the step advances to the step S208, and when the time period t is not equal to or greater than the moving image recording time L as the result, the step returns to the step S204.

In the step S208, the image data that is photographed by the time traced back from the time when the still image is photographed by the time period t, among the image data recorded in the RAM 102, is recorded in the recording medium mounted on the media drive 107, as moving image data. At this time, when the moving image data is already recorded in the recording medium by the still image photographing, the moving image data is recorded, so as to be combined with the moving image data.

As is described above, according to the present embodiment, the digital still camera is configured to discriminate whether the image data is image data that the photographer desires or not, by using the directional difference between the shooting directions. Thereby, the digital still camera may record data from which the image data of which the shooting direction largely changes, is removed, according to a predetermined moving image format, and may prevent an image that the photographer does not desire from being recorded. Incidentally, in the present embodiment, an example is described in which 0.5 seconds are set as a set value of the width of the step x, 0.2 seconds are set as a set value of the threshold value T, and four seconds are set as a set value of the moving image recording time L. These set values can be changed by an input operation from the input device 106.

Alternatively, a half-depressing flag may be related to shooting direction data and be recorded in a case when the shutter button of the digital still camera 100 is in a half-depression state, when the shooting direction data is recorded in the RAM 102. In many cases, the photographer operates the camera to detect a focus (focus) in such a way of half-depressing the shutter button, and, accordingly, the image data recorded in the RAM 102 in a state in which the shutter button is in the half-depression state can be considered as image data that the photographer desires. Then, the digital still camera may be configured so as to determine that the shooting direction is an appropriate shooting direction, in the step S205, and advance from the step S205 to the step S206, in a case when the half-depressing flag is related to the shooting direction data, when acquiring the information on the shooting direction in the step S202 or S204.

On the other hand, in a case when the shooting direction that is obtained in the step S202 or S204 is directed downward, the CPU 101 may determine that the shooting direction is an inappropriate direction, in the step S205, and may advance from the step S205 to the step S208. Thereby, when the photographer directs the main body downward in order to change the setting of the digital still camera, for instance, the digital still camera can avoid recording image data that the photographer does not intend to photograph, in the recording medium, when the still image is photographed. Thus, the photographer can set the processings of relating the half-depressed flag to the shooting direction and discriminating whether the shooting direction is a downward direction or not, by an input operation from the input device 106.

In addition, it may be set whether the processing of removing the image data according to the present embodiment is performed or not, by the input operation from the input device 106. The CPU 101 skips the processings from the step S202 to the step S207, in a case when the processing of removing the image data is set so as not to be performed. Thus, the image data of a predetermined time period precedent to the still image photographing is recorded in the recording medium mounted on the media drive 107 according to a predetermined moving image format. Thereby, when the still image is photographed, the image data, which is stored before the still image is photographed, can always be recorded.

Furthermore, when the directional difference exceeds the threshold value T as a result of the discrimination in the step S205, only the image data corresponding to such a directional difference may be removed, and the remaining moving image data may be recorded in the recording medium according to a predetermined moving image format, in the step S208. By doing so, the photographer can obtain moving image data in which only image data photographed in an inappropriate direction is removed. In this case, the camera is arranged such that it can be set whether the above-described processing is used or not, by the input operation from the input device 106.

In addition, in a mode of recording the image data and the shooting direction data in the RAM 102 before the still image is photographed, a shooting direction change flag may be recorded in addition to the above-described shooting direction data. The shooting direction change flag is set when the directional difference is larger than the threshold value T, in the same method as that in the step S205. In this case, for instance, a directional difference is obtained by comparing the shooting direction data of the latest image data with that of the image data traced back by a predetermined time period. Thus, it can be discriminated whether the image data precedent to the still image photographing is recorded in the recording medium or not when the still image is photographed, by obtaining the shooting direction change flag in any one of the steps S202, S204, and 205. As a result of this, the load of the processing when the still image is photographed can be reduced, and it can be discriminated whether the image data is recorded or not, at a higher speed.

Alternatively, when the shooting direction is changed over, the predetermined threshold value at a moment at which the still image is photographed in the step S201, the processings in the steps S202 to S207 are skipped, and the moving image data precedent to the still image photographing may be recorded in the recording medium, according to the predetermined moving image format. Thereby, the photographer can obtain the image data precedent to the still image photographing, even when photographing the still image of an object that is moving greatly. In this case, the camera is arranged such that it can be set whether the above-described processing is used or not, by the input operation from the input device 106.

Note that the moving image data is recorded as a moving image file separated from a still image. In addition, it will be inconvenient that a new moving image file is generated every time a plurality of still images is photographed, so that the number of recorded files increases greatly. In such a case, it may be preferable to combine the moving image file generated at each still image photographing with the already-recorded moving image file to generate a new file. Further, it may be more convenient to manage the new file generated by combining the moving image files as a separate file on each date basis.

Second Embodiment

In the first embodiment, an example is described in which a directional difference is calculated from a difference between a shooting direction A of the time when the still image is photographed and a shooting direction B of the time traced back by a predetermined time period t from the time when the still image is photographed. In contrast to this, in the present embodiment, an example will be described, in which a directional difference is calculated from a change amount per predetermined time period of a difference between a shooting direction A of the time traced back by a predetermined time period t1 from the time when the still image is photographed, and a shooting direction B of the time traced back by a predetermined time period t2 from the time when the still image is photographed. Incidentally, the configuration of the digital still camera according to the present embodiment is similar to that in the first embodiment, and, accordingly, a description of this will be omitted.

Figure 3:
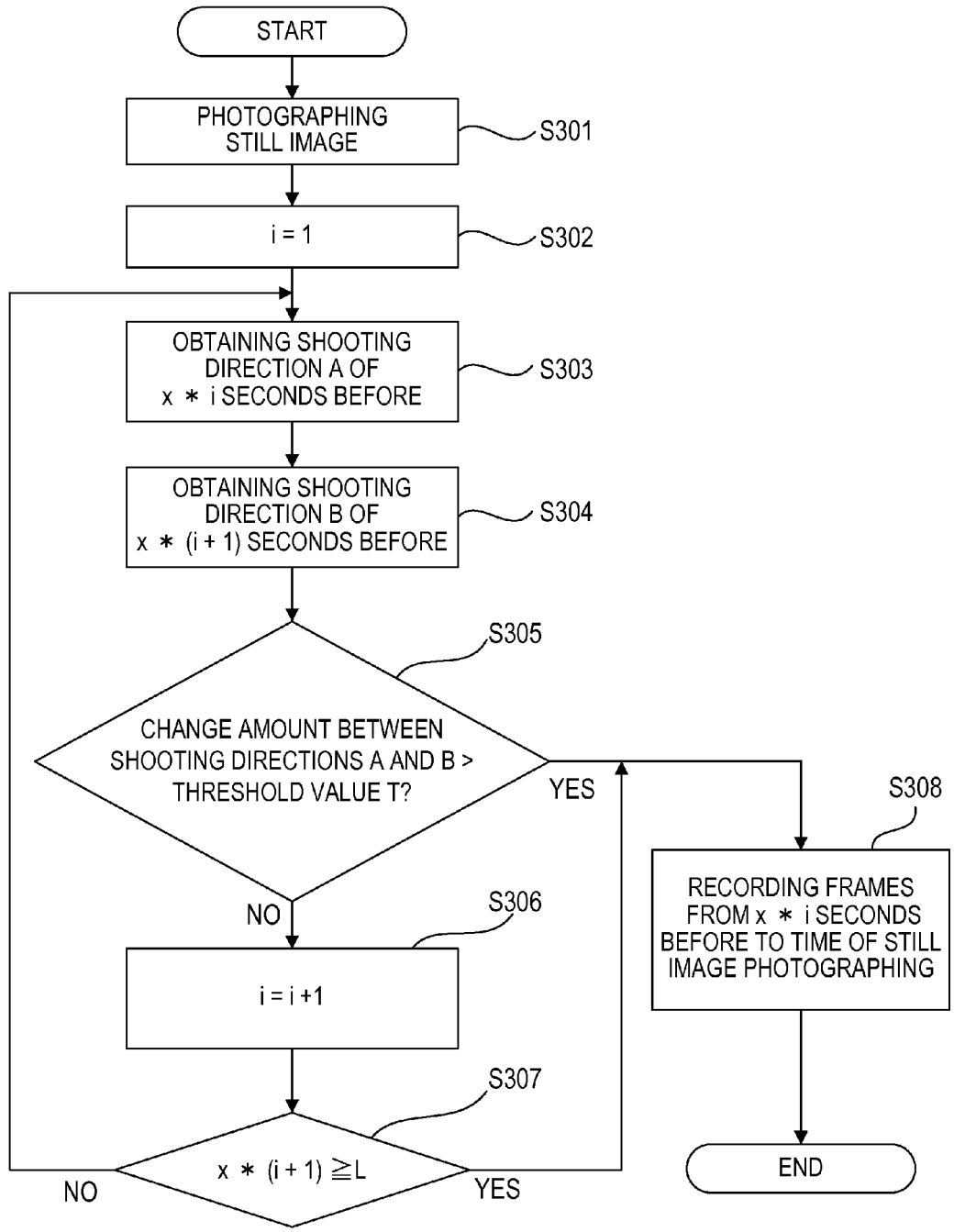
FIG. 3 is a flow chart illustrating one example of a photographing procedure in a digital still camera according to the second embodiment.

FIG. 3 is a flow chart illustrating one example of a photographing procedure in the digital still camera 100, in the present embodiment. The processing illustrated in FIG. 3 is performed by the CPU 101, which executes the control program that is developed from the ROM 103 to the RAM 102. In addition, in the present embodiment, note that the same values as those in the first embodiment are used as values of the width of the step x, the threshold value T and the moving image recording time L. Furthermore, in the following description, note that the digital still camera operates in a mode of temporarily recording image data obtained by the solid-state image pickup element after the power source is turned on, and the shooting direction data obtained by the three-axis geomagnetic sensor 108, in the RAM 102.

First, in a step S301, the CPU 101 receives an instruction to photograph a still image from the input device 106, and starts the processing of photographing the still image. Then, in a step S302, the CPU 101 assigns 1 to a counter i. The counter i is similar to that described in the first embodiment.

Next, in a step S303, the CPU 101 obtains informatation on a shooting direction A of the time traced back by a time period t1 (first time period) given by multiplying the counter i by the width of the step x from the time when the still image is photographed, from the shooting direction data recorded in the RAM 102. Then, in a step S304, the CPU 101 obtains information on a shooting direction B of the time traced back by a time period t2 (second time period) given by multiplying a value obtained by adding 1 to the counter i by the width of the step x from the time when the still image is photographed, from the shooting direction data recorded in the RAM 102.

Next, in a step S305, a directional difference diff is calculated according to the above-described expression (1), and a change amount diff' of the directional difference per unit time period is calculated by dividing the directional difference diff by a photographing time difference dt that is obtained by subtracting the time period t1 from the time period t2. In the present embodiment, the change amount diff' is used as the directional difference. Then, it is discriminated whether the directional difference (change amount diff) exceeds the threshold value T or not.

When the directional difference exceeds the threshold value T as a result of the discrimination in the step S305, the step advances to a step S308, and when the directional difference does not exceed the threshold value T as the result, the step advances to a step S306.

In the step S306, 1 is added to the counter i. Then, in a step S307, it is discriminated whether a time period t given by multiplying a value obtained by adding 1 to the counter i by the width of the step x is equal to or greater than a moving image recording time L. When the time period t is equal to or greater than the moving image recording time L as a result of this discrimination, the step advances to the step S308, and when the time period t is not equal to or greater than the moving image recording time L as the result, the step returns to the step S303.

In the step S308, the image data, by the time traced back by the time period t from the time when the still image is photographed, is recorded in the recording medium mounted on the media drive 107, as moving image data.

As described above, the digital still camera according to the present embodiment may record moving image data from which image data, which a photographer does not desire, is removed. In the present embodiment, a value obtained by dividing the directional difference used in the first embodiment by the photographing time difference is used as the directional difference. Because of this, in a photographing method such as a panning photographing method that gradually changes the direction of an image pickup apparatus, the image pickup apparatus can determine that the image data precedent to the still image photographing is image data which the photographer desires, and may record the image data.

Alternatively, when determining an inappropriate direction in the step S305, the image pickup apparatus may determine the direction by using a value of dispersion of the directional difference. In this case, the image pickup apparatus records the information on the directional difference in each count in the RAM 102, and performs the processing of updating the value of the dispersion of the directional difference every time the directional difference is determined. In addition, in a case when the updated value of the dispersion is used, if the value of the dispersion is small, the image pickup apparatus determines that the directional difference does not almost change, or the directional difference changes, but this change is of uniform motion, and can determine in the step S305 that the shooting direction is an appropriate direction. Thereby, even when the photographer changes the shooting direction with movement close to a uniform speed, the image pickup apparatus can record the image data precedent to the still image photographing in the recording medium.

Third Embodiment

In the first and second embodiments, such a method is described that an image pickup apparatus determines image data that the photographer does not desire. On the other hand, in the present embodiment, such a method will be described that the image pickup apparatus determines image data of which the shooting direction largely changes when the moving image data is reproduced. Incidentally, in the following description, such a point will be mainly described below that the image pickup apparatus discriminates whether image data recorded in a recording medium is image data that the photographer desires or not.

Figure 4:
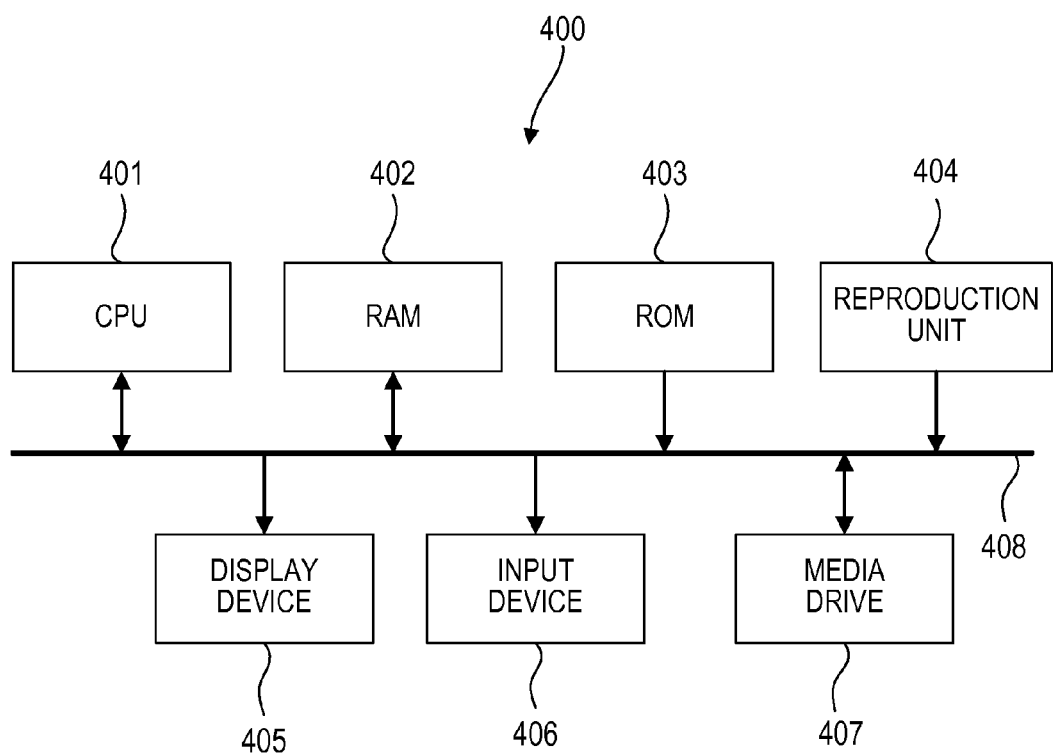
FIG. 4 is a block diagram illustrating a configuration example of a reproduction apparatus according to a third embodiment.

FIG. 4 is a block diagram illustrating a configuration example of a reproduction apparatus 400 according to the present embodiment. Incidentally, a CPU 401 to a ROM 403 are similar to the CPU 101 to the ROM 103 of FIG. 1, respectively. A reproduction unit 404 reads out moving image data from the recording medium mounted on a media drive 407. In addition, a display device 405 to the media drive 407 are similar to the display device 105 to the media drive 107 of FIG. 1, respectively, and a system bus 408 is similar to the system bus 109 of FIG. 1. Incidentally, note that the moving image data is recorded according to the predetermined moving image format and is related to a frame or a GOP (Group of Pictures), and that the information on the shooting direction is recorded in the recording medium.

Figure 5:
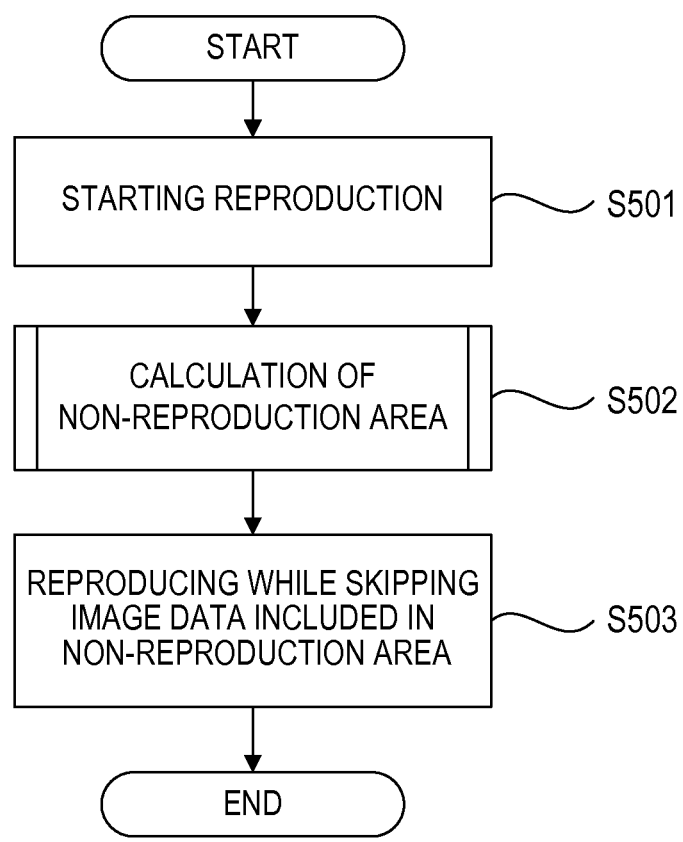
FIG. 5 is a flow chart illustrating one example of a reproduction procedure by the reproduction apparatus according to the third embodiment.

FIG. 5 is a flow chart illustrating one example of a reproduction procedure in the reproduction apparatus 400 according to the present embodiment. The processing illustrated in FIG. 5 is performed by the CPU 401, which executes the control program that is developed from the ROM 403 to the RAM 402. In addition, in the present embodiment, note that the same values as those in the first embodiment are used as values of the width of the step x and the threshold value T.

First, in a step S501, the CPU 401 receives an instruction to reproduce moving image data from the input device 406, and starts the processing of reproducing the moving image data output from the recording medium through the reproduction unit 404. Next, in a step S502, the CPU 401 calculates a non-reproduction area out of the reproduced moving image data. A detailed method of calculating the non-reproduction area will be described later with reference to FIG. 6. In a step S503, the reproduction apparatus reproduces the moving image data while skipping the image data included in the non-reproduction area.

Figure 6:
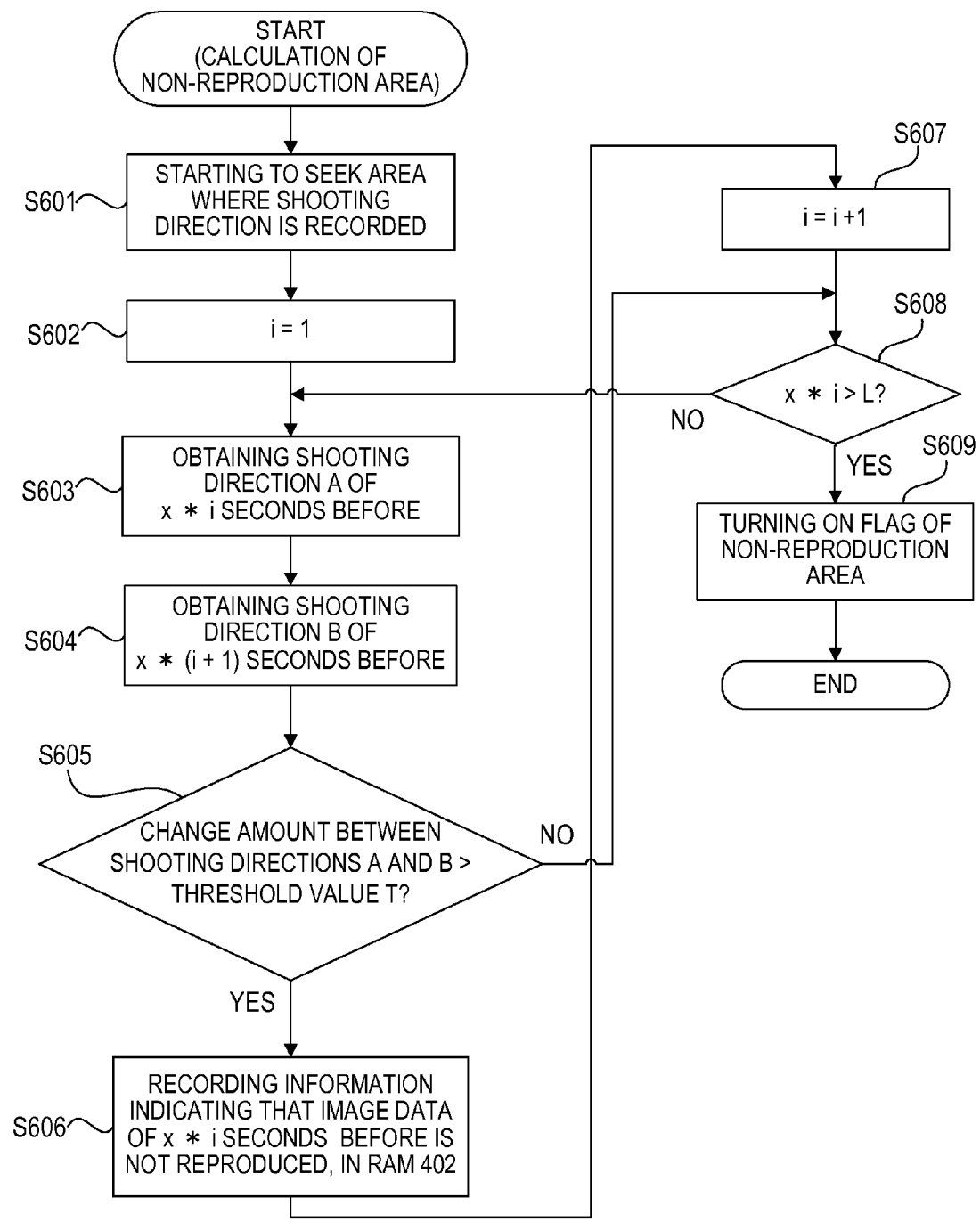
FIG. 6 is a flow chart illustrating one example of a calculation procedure of a non-reproduction area in a step S502 of FIG. 5.

FIG. 6 is a flow chart illustrating one example of a calculation procedure of the non-reproduction area in a step S502 of FIG. 5.

First, in a step S601, the CPU 401 seeks a region in which information on a shooting direction is recorded, from the file structure of the moving image data. Next, in a step S602, the CPU 401 assigns 1 to a counter i. The counter i is a counter that is used for successively discriminating whether the image data recorded in the RAM 402 is image data that the photographer desires or not, from the head of the moving image data. In addition, the head of the moving image is a front frame or a front GOP of the moving image.

Next, in a step S603, the CPU 401 obtains information on a shooting direction A of the time when a time period t1 (first time period) given by multiplying the counter i by the width of the step x elapses from the head of the moving image. Then, in a step S604, similarly to the step S603, the CPU 401 obtains information on a shooting direction B of the time when a time period t2 (second time period) given by multiplying a value obtained by adding 1 to the counter i by the width of the step x elapses from the head of the moving image.

Next, in a step S605, the CPU 401 calculates a directional difference between the shooting direction A and the shooting direction B, and discriminates whether the above-described directional difference exceeds a threshold value T or not. The directional difference is calculated in a similar method to that in the step S305 of FIG. 3 described in the second embodiment. For information, the method of obtaining the value of the dispersion of the directional difference described in the second embodiment, and the method of the step S205 of FIG. 2 described in the first embodiment may be used. When the above-described directional difference exceeds the threshold value T as a result of the discrimination in the step S605, the step advances to a step S606, and when the above-described directional difference does not exceed the threshold value T as the result, the step advances to a step S607.

In step S606, the CPU 401 records information that gives an indication not to reproduce the image data precedent to the time period t1 given by multiplying the counter i by the width of the step x, in the RAM 402. In the step S607, 1 is added to the counter i.

In the next step, step S608, the CPU 401 discriminates whether the time period t given by multiplying a value obtained by adding 1 to the counter i by the width of the step x is equal to or greater than a moving image reproducing time L. When the time period t is equal to or greater than the moving image reproducing time L as a result of this discrimination, the step advances to the step S609, and when the time period t is not equal to or greater than the moving image reproducing time L as the result, the step returns to the step S603. In the step S609, a flag is turned on, which gives an instruction to skip image data corresponding to a non-reproduction area among the moving image data on the basis of the information recorded in the step S606.

As described above, according to the present embodiment, the reproduction apparatus can reproduce the moving image data, from which image data that the photographer does not desire, is removed. Thereby, the camera does not need to perform the processing of removing a portion of the moving image data when recording the moving image data precedent to the still image photographing, and can prevent image data that the photographer desires from being erroneously removed.

While in the above-described embodiment, the invention is explained as an example in a case of recording the moving image for several seconds before photographing, the invention is also applicable to a case, such as a case of recording the moving image for several seconds after photographing, or a case of recording the moving image for several seconds around a photographing instruction.

In the above-described example, the camera detects the shooting direction of the camera with a three-axis geomagnetic sensor, and records information on the shooting direction together with the moving image data.

Instead of this "shooting direction", the camera may detect the attitude of the camera, and may record informatation concerning the attitude of the camera together with the moving image data.

This information concerning the attitude of the camera may be expressed as an optical axis direction of the lens, or may also be information that three-dimensionally expresses a difference of the change of the attitude of the camera with respect to a particular reference attitude of the camera.

In addition, the change amount per unit time period of the attitude of the camera may be used as in Exemplary Embodiment 2, in place of the information regarding the change amount of the shooting direction.

In addition, instead of the above-described information concerning the shooting direction of the camera and the attitude of the camera, the camera may be configured to detect the shooting direction of the camera and the attitude of the camera, and to record, relatedly to the moving image data, the flag information that indicates that there is a large change, in a case when there is a larger change than a predetermined criterion.

Other Embodiments

Aspects of the present invention can also be realized by a computer of a system or an apparatus (or devices such as a CPU or an MPU) that reads out and executes a program recorded on a memory device to perform the functions of the above-described embodiment(s), and by a method, the steps of which are performed by a computer of a system or an apparatus by, for example, reading out and executing a program recorded on a memory device to perform the functions of the above-described embodiment(s). For this purpose, the program is provided to the computer, for example, via a network or from a recording medium of various types serving as the memory device (e.g., a computer-readable medium).

While the present invention is described with reference to exemplary embodiments, it is to be understood that the invention is not limited to the disclosed exemplary embodiments. The scope of the following claims is to be accorded the broadest interpretation so as to encompass all such modifications, and equivalent structures and functions.

What is claimed is:

1. An image pickup apparatus comprising:
   an image pickup unit that picks up an object to generate moving image data;
   a detection unit that detects at least one of a shooting direction of the image pickup unit and an attitude of the image pickup apparatus;
   a storage unit that temporarily stores moving image data generated by the image pickup unit;
   an instruction unit that instructs operation to photograph a still image; and
   a recording unit that reads out the moving image data traced back by a predetermined time period from a timing when still image photographing is instructed by the instruction unit, from the storage unit, and records the read-out moving image data in a recording medium,
   wherein, in the moving image data traced back by the predetermined time period, the recording unit does not record, in the recording medium, at least a portion of the moving image data in the predetermined time period, based on at least one of the shooting direction and the attitude of the image pickup apparatus detected by the detection unit.

2. The image pickup apparatus according to claim 1, further comprising a calculation unit that calculates a change amount of the one of the shooting direction and the attitude of the image pickup apparatus, which is detected by the detection unit,
   wherein the recording unit records, in the recording medium, moving image data in which data that is generated before a time point when a change amount calculated by the calculation unit exceeds a predetermined criterion is removed.

3. The image pickup apparatus according to claim 1, further comprising a calculation unit that calculates a change amount per unit time period of the one of the shooting direction and the attitude of the image pickup apparatus, which is detected by the detection unit,
   wherein the recording unit records, in the recording medium, moving image data in which data that is generated before a time point when a change amount per unit time period calculated by the calculation unit exceeds a predetermined criterion is removed.

4. A method of controlling an image pickup apparatus having an image pickup unit that picks up an object to generate moving image data, and a storage unit that temporarily stores the moving image data generated by the image pickup unit, the method comprising:
   detecting at least one of a shooting direction of the image pickup unit and an attitude of the image pickup apparatus;

instructing operation to photograph a still image from an instruction unit; and reading out the moving image data traced back by a predetermined time period from a time point when still image photographing is instructed in the instructing, from the storage unit, and recording the read-out moving image data in a recording medium, wherein, in the moving image data traced back by the predetermined time period, the recording unit does not record, in the recording medium, at least a portion of the moving image data in the predetermined time period, based on at least one of the shooting direction and the attitude of the image pickup apparatus detected by the detection unit.

5. A non-transitory computer-readable storage medium storing program code causing a computer to control an image pickup apparatus including an image pickup unit that picks up an object to generate moving image data, the medium comprising:

first program code means for detecting at least one of a shooting direction of the image pickup unit and an attitude of the image pickup apparatus;

second program code means for temporarily storing the moving image data generated by the image pickup unit, in a storage unit;

third program code means for instructing operation to photograph a still image from an instruction unit; and fourth program code means for reading out the moving image data traced back by a predetermined time period from a time point when still image photographing is instructed by the instruction unit, from the storage unit, and recording the read-out moving image data in a recording medium, wherein, in the moving image data traced back by the predetermined time period, the recording unit does not record, in the recording medium, at least a portion of the moving image data in the predetermined time period, based on at least one of the shooting direction and the attitude of the image pickup apparatus detected by the detection unit.

6. The method according to claim 4, further comprising a calculation unit that calculates a change amount of the one of the shooting direction and the attitude of the image pickup apparatus, which is detected by the detection unit, wherein the recording unit records, in the recording medium, moving image data in which data that is generated before a time point when a change amount calculated by the calculation unit exceeds a predetermined criterion is removed.

7. The method according to claim 4, further comprising a calculation unit that calculates a change amount per unit time period of the one of the shooting direction and the attitude of the image pickup apparatus, which is detected by the detection unit, wherein the recording unit records, in the recording medium, moving image data in which data that is generated before a time point when a change amount per unit time period calculated by the second calculation unit exceeds a predetermined criterion is removed.

8. The non-transitory computer-readable storage medium according to claim 5, further comprising a calculation unit that calculates a change amount of the one of the shooting direction and the attitude of the image pickup apparatus, which is detected by the detection unit, wherein the recording unit records, in the recording medium, moving image data in which data that is generated before a time point when a change amount calculated by the calculation unit exceeds a predetermined criterion is removed.

9. The non-transitory computer-readable storage medium according to claim 5, further comprising a calculation unit that calculates a change amount per unit time period of the one of the shooting direction and the attitude of the image pickup apparatus, which is detected by the detection unit, wherein the recording unit records, in the recording medium, moving image data in which data that is generated before a time point when a change amount per unit time period calculated by the second calculation unit exceeds a predetermined criterion is removed.

* * * * *